(12) United States Patent  
Parenti et al.

(10) Patent No.: US 9,387,753 B2  
(45) Date of Patent: Jul. 12, 2016

(54) DRIVE ARRANGEMENT FOR A HYBRID-DRIVE MOTOR VEHICLE

(71) Applicants: Automobili Lamborghini S.p.A., Sant'Agata Bolognese BO (IT); Green Propulsion SA, Liege (BE)

(72) Inventors: Riccado Parenti, Calderara di Reno BO (IT); Roberto Diani, Modena MO (IT); Gian Paolo Poltronieri, San Martino Spino MO (IT); Fabio Belletti, Malalbergo BO (IT); Yves Toussaint, Liege (BE)

(73) Assignees: AUTOMOBILI LAMBORGHINI S.p.A., Sant Agata Bolognese Bo (IT); GREEN PROPULSION SA, Liege (BE)

( * ) Notice: Subject to any disclaimer, the term of this patent is extended or adjusted under 35 U.S.C. 154(b) by 0 days.

(21) Appl. No.: 14/424,359

(22) PCT Filed: Aug. 7, 2013

(86) PCT No.: PCT/IB2013/056458  
§ 371 (c)(1),  
(2) Date: Feb. 26, 2015

(87) PCT Pub. No.: WO2014/033569  
PCT Pub. Date: Mar. 6, 2014

(65) Prior Publication Data  
US 2015/0224866 A1 Aug. 13, 2015

(30) Foreign Application Priority Data  
Aug. 31, 2012 (IT) .............................. MI2012A1463

(51) Int. Cl.  
*B60K 6/36* (2007.10)  
*B60K 6/445* (2007.10)  
*B60K 6/387* (2007.10)  
*B60K 6/48* (2007.10)  
*B60K 6/52* (2007.10)  
*B60K 6/547* (2007.10)  
*F16H 37/04* (2006.01)  
(Continued)

(52) U.S. Cl.  
CPC . *B60K 6/445* (2013.01); *B60K 6/36* (2013.01); *B60K 6/365* (2013.01); *B60K 6/387* (2013.01);  
(Continued)

(58) Field of Classification Search  
CPC .......... F16H 61/688; F16H 3/08; F16H 3/006  
See application file for complete search history.

(56) References Cited

U.S. PATENT DOCUMENTS

| 3,837,237 A | 9/1974 | Rössler et al. | |
|---|---|---|---|
| 6,427,797 B1 * | 8/2002 | Chang | B60K 1/00 180/233 |

(Continued)

FOREIGN PATENT DOCUMENTS

| DE | 101 52 472 | 5/2003 |
|---|---|---|
| DE | 101 52 481 | 5/2003 |

(Continued)

OTHER PUBLICATIONS

International Search Report issued by the European Patent Office in International Application PCT/IB2013/056458.

*Primary Examiner* — Derek D Knight  
(74) *Attorney, Agent, or Firm* — Henry M. Feiereisen LLC

(57) ABSTRACT

A drive arrangement for a hybrid-drive motor vehicle includes an internal combustion engine and at least one electrical machine which, via a speed-change gearbox having a plurality of gear ratios, provide, alternately or together, an output drive to at least one axle differential of the motor vehicle. The internal combustion engine can be uncoupled by a disconnecting clutch. The gearbox is divided into two sub-gearboxes, with the internal combustion engine being connected for drive to the first sub-gearbox such as not to be able to be uncoupled. The electrical machine is arranged, in the path along which force is transmitted, downstream of the disconnecting clutch arranged at the output of the first sub-gearbox but upstream of the second sub-gearbox. The output of the second sub-gearbox provides an output drive to the axle differential.

14 Claims, 3 Drawing Sheets

(51) Int. Cl.
  *B60K 6/365* (2007.10)
  *B60K 17/02* (2006.01)
  *F16H 37/08* (2006.01)

(52) U.S. Cl.
  CPC ... *B60K 6/48* (2013.01); *B60K 6/52* (2013.01); *B60K 6/547* (2013.01); *F16H 37/046* (2013.01); *B60K 17/02* (2013.01); *B60K 2006/4816* (2013.01); *B60Y 2400/73* (2013.01); *B60Y 2400/80* (2013.01); *B60Y 2400/82* (2013.01); *F16H 2037/0866* (2013.01); *F16H 2200/0052* (2013.01); *Y02T 10/6221* (2013.01); *Y02T 10/6256* (2013.01); *Y02T 10/6265* (2013.01); *Y02T 10/7258* (2013.01); *Y10S 903/91* (2013.01); *Y10T 74/19014* (2015.01)

(56) References Cited

U.S. PATENT DOCUMENTS

| | | | |
|---|---|---|---|
| 6,428,438 | B1 | 8/2002 | Bowen |
| 7,314,105 | B2 * | 1/2008 | Varela ............... B60K 7/0007 180/242 |
| 8,677,847 | B2 | 3/2014 | Diani |
| 8,689,655 | B2 | 4/2014 | Diani |
| 2003/0078127 | A1 | 4/2003 | Kramer |
| 2008/0314661 | A1 | 12/2008 | Soliman |
| 2011/0259657 | A1 | 10/2011 | Fuechtner |
| 2011/0303048 | A1 * | 12/2011 | Genise ............... B60K 6/12 74/665 A |
| 2013/0205946 | A1 | 8/2013 | Diani |
| 2013/0217537 | A1 | 8/2013 | Kaltenbach |
| 2013/0233104 | A1 | 9/2013 | Diani |

FOREIGN PATENT DOCUMENTS

| | | |
|---|---|---|
| DE | 10 2008 023 732 | 1/2009 |
| DE | 10 2010 030 576 | 12/2011 |
| EP | 2 143 583 | 1/2010 |
| JP | 2007-237794 | 9/2007 |
| JP | 2007-245845 | 9/2007 |
| JP | 2011-230755 | 11/2011 |
| WO | WO 2011/014531 | 2/2011 |

* cited by examiner

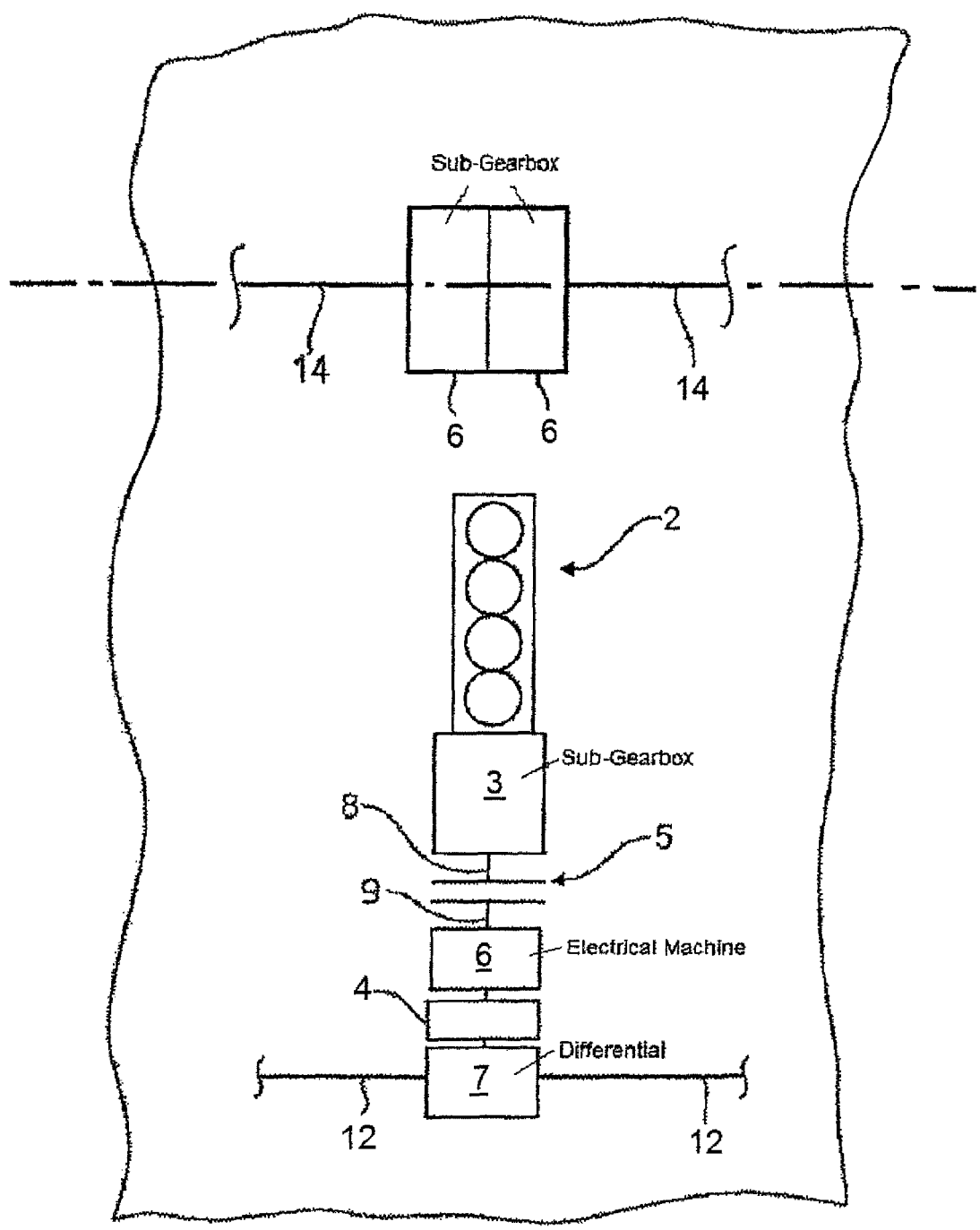

DRIVE ARRANGEMENT FOR A HYBRID-DRIVE MOTOR VEHICLE

CROSS-REFERENCES TO RELATED APPLICATIONS

This application is the U.S. National Stage of International Application No. PCT/IB2013/056458, filed Aug. 7, 2013, which designated the United States and has been published as International Publication No. WO 2014/033569 and which claims the priority of Italian Patent Application, Ser. No. MI2012A001463, filed Aug. 31, 2012, pursuant to 35 U.S.C. 119(a)-(d).

BACKGROUND OF THE INVENTION

The present invention relates to a drive arrangement for a hybrid-drive motor vehicle.

In conventional hybrid drive arrangements employing an internal combustion engine as a first source of drive and an electrical machine as a second source of drive, the internal combustion engine acts on one axle differential (to give front-wheel or rear-wheel drive) or on two axle differentials (to give all-wheel drive), via a speed-change gearbox having gear ratios (six or seven for example) which cover the motor vehicle's speed range. The electrical machine is able to provide a drive output to one of the axle differentials either directly or by being coupled thereto via the gearbox. If the motor vehicle has a relatively wide speed range and this range is to be covered by an electrical machine whose weight is good (but whose torque is lower), then a further gearbox having two gear ratios for example is required at the electrical machine.

DE 10 2008 023 732 A1 for example shows a hybrid drive in which a first electrical machine is inserted between the internal combustion engine and the gearbox and a second electrical machine provides an output drive to the same axle differential as the internal combustion engine, via planetary gearing to allow speeds to be matched.

Further, WO 2011/014531 describes a hybrid drive arrangement in which a first electrical machine is coupled to the change-speed gearbox flange-mounted on the internal combustion engine and is able in addition to provide a drive output to one axle differential, while a second electrical machine is connected for drive directly to a second axle differential to provide all-wheel drive.

The electrical machines can be connected in the usual way to act as drive motors, to rotate freely or to act as generators in a recuperation mode.

SUMMARY OF THE INVENTION

It is an object of the invention to propose a hybrid drive arrangement of the generic kind which, with reduced structural cost and complication, is able to cover a high speed range for a vehicle, the internal combustion engine and the at least one electrical machine being able to be operated in a speed range which is good for efficiency.

This object is achieved by a drive arrangement for a hybrid-drive motor vehicle, having an internal combustion engine and at least one electrical machine which, via a speed-change gearbox having a plurality of gear ratios, provide, alternately or together, an output drive to at least one axle differential of the motor vehicle, the internal combustion engine being able to be uncoupled by means of a disconnecting clutch, wherein the gearbox is divided into two sub-gearboxes, and preferably into two sub-gearboxes which each have at least two gear ratios, with the internal combustion engine being connected for drive to the first sub-gearbox, i.e. in such a way as not to be able to be uncoupled, and with the electrical machine further being arranged, in the path along which force is transmitted, downstream of the disconnecting clutch arranged at the output of the first sub-gearbox but upstream of the second sub-gearbox, and with the output of the second sub-gearbox providing an output drive to the axle differential.

Advantageous refinements of the invention are set forth in the dependent claims.

In accordance with the invention, it is proposed that the gearbox be divided into two sub-gearboxes each having at least two gear ratios, with the internal combustion engine being connected for drive to the first sub-gearbox, i.e. in such a way as not to be able to be uncoupled. Also, the electrical machine is arranged, in the path along which force is transmitted, downstream of the disconnecting clutch arranged at the output of the first sub-gearbox but upstream of the second sub-gearbox, and the output of the second sub-gearbox provides an output drive to the axle differential. When for example the motor vehicle is in the internal combustion engine driven mode, the proposed splitting of the gearbox causes the internal combustion engine to act on both sub-gearboxes, in which case the gear ratios of the two sub-gearboxes are multiplied, whereas the electrical machine provides an output drive via one sub-gearbox. By means of the disconnecting clutch, the internal combustion engine and the first sub-gearbox can be stopped in the electric motor driven mode and thus do not cause any drag losses or frictional losses.

The gear ratios of the two sub-gearboxes can be matched to the lower speeds of the internal combustion engine and the considerably higher speeds of the electrical machine; in particular the gear ratios of the two sub-gearboxes may be so designed that the internal combustion engine and the at least one electrical machine reach their preset maximum speeds at a defined final speed for the vehicle.

As a particular preference, the second sub-gearbox may be changed over from 1:1 transmission (in the higher speed range) to a gear ratio which differs therefrom and is preferably lower. Especially this sub-gear box can be a planetary gearbox, which is of good efficiency and can be changed over under load, i.e. can be operated without the use of a further clutch, such as electro-hydraulically for example.

What is more, the first sub-gearbox may have a reverse gear to make it possible for the motor vehicle to move in reverse even when in a mode where it is driven purely by the internal combustion engine (such as when the traction battery is discharged for example).

As a particular preference, the first sub-gearbox may have at least half of the forward gears provided or exactly half of the forward gears provided and/or three or more forward gears, and in conjunction with the second sub-gearbox a defined spread of gear ratios may be obtained or preset, to obtain for example a spread of >4 and, as a rule, approximately 6. The two sub-gearboxes thus reliably cover the conversion range appropriate to the internal combustion engine and also ensure that an optimum match is made for the electrical machine.

It is particularly beneficial from the point of view of control for the second sub-gearbox to be able to have its gear changed, in drive by the internal combustion engine and in hybrid drive, as a function of, amongst other things, the gear in which the first sub-gearbox is, and, when drive is by electric motor, for it to be able to have its gear changed as a function of, amongst other things, the speed of the motor vehicle.

In the internal combustion engine driven mode, the change of gear of the second sub-gearbox is dependent on normal parameters such as the speed of the motor vehicle, the demands made by the load, as transmitted via an accelerator pedal, the layout of the gear ratios, etc.; what this means is that, possibly in alternation, there is change of a gear ratio in the first sub-gearbox and a gear change is made in the second sub-gearbox to change to the next (full) gear ratio, and so on. In the electric motor driven mode, a limiting value of speed and possibly a load signal too may be significant for the change of gear.

In an advantageous refinement of the invention, it may be possible for a second axle differential of the motor vehicle as well to be driven, by a second electrical machine, to obtain at least temporally all-wheel drive, this electrical machine being connected to the axle differential for example via a sub-gearbox which is preferably identical in construction to the first electrical machine and which has a plurality of gear ratios, such for example as a similar two, which can be changed over. It is possible in this way to produce an identicalness of parts for the axle differentials, for the corresponding sub-gearboxes and possibly for the electrical machines, which identicalness of parts is beneficial from the point of view of production.

As far as control is concerned, the sub-gearbox of the axle differential which has an additional electrical drive may be changed over simply as a function only of the speed of the motor vehicle and/or in synchronization with the second sub-gearbox belonging to the other axle differential. Furthermore, when the motor vehicle is in the all-wheel drive mode and the traction battery is in a marginal state of charge (i.e. has achieved a predefined level/threshold as regards the state of charge), the electrical machine connected to the internal combustion engine may be connected as a generator which supplies the driving 5 energy for the second electrical machine, to allow the all-wheel drive to be maintained.

Furthermore, when the motor vehicle is in the all-wheel drive mode and the traction battery is in a marginal state of charge (i.e. has achieved a predefined level/threshold as regards the state of charge), the electrical machine connected to the internal combustion engine may be connected as a generator which supplies the driving energy for the second electrical machine, to allow the all-wheel drive to be maintained.

Finally, in an alternative embodiment of the second, electrically driven drive axle of the motor vehicle, two electrical machines can be arranged which separately and without a differential directly or indirectly provide a drive output to the drive shafts connected to the wheels of the drive axle. The two electrical machines not only permit the required speed compensation between the wheels when cornering but also permit torque vectoring to increase the driving dynamics properties of the motor vehicle.

BRIEF DESCRIPTION OF THE DRAWING

Three embodiments of the invention are explained in detail below together with further details. In the schematic drawings:

FIG. 3 is a block circuit diagram of an alternative arrangement of the second drive axle having two electrical machines.

DETAILED DESCRIPTION OF PREFERRED EMBODIMENTS

Figure 1:
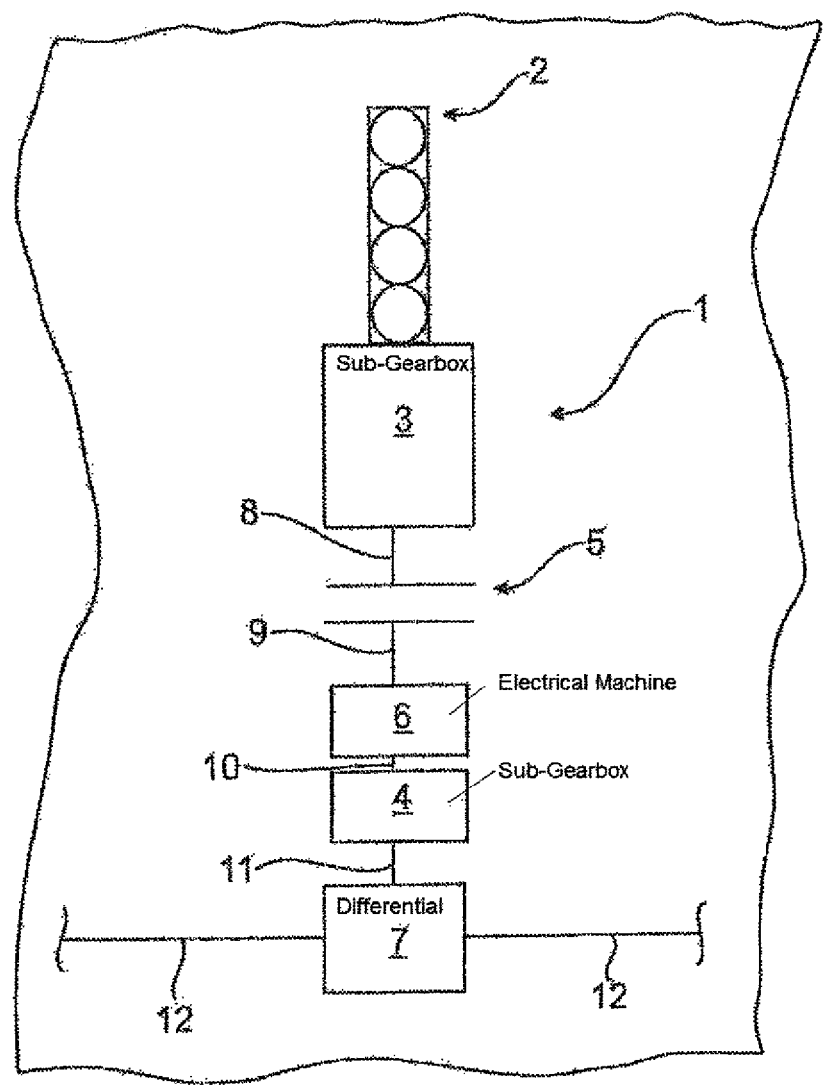
FIG. 1 is a block circuit diagram of a first hybrid drive arrangement, for a rear-wheel drive motor vehicle, which has an internal combustion engine, a disconnecting clutch and two co-operating sub-gearboxes and into which an electrical machine is functionally incorporated.

FIG. 1 is a block circuit diagram showing a hybrid drive arrangement 1 in a motor vehicle, which hybrid drive arrangement 1 has, in essence, an internal combustion engine 2, a change-speed gearbox formed by two sub-gearboxes 3, 4, a disconnecting clutch 5 and an electrical machine 6 which provides an output drive to a rear axle differential 7 of the motor vehicle. The axle differential 7 drives the rear wheels of the motor vehicle via half-shafts 12 of which only parts are shown.

The internal combustion engine 2, which is arranged for example as a mid-engine in the motor vehicle, is connected for drive to the first sub-gearbox 3 positioned downstream of it. A disconnecting clutch able to interrupt the flow of drive power is not necessarily provided. However, a damper of rotary oscillations (a dual-mass flywheel for example) or, where an automatic gearbox is used as the sub-gearbox 3, a torque converter, may be inserted into the connection between the input shaft of the gearbox 3 and the output shaft (crankshaft) of the internal combustion engine 2.

The sub-gearbox 3 is preferably a manual or automated gearbox of known design which is provided with at least two, and in the embodiment with four, forward gears and one reverse gear.

Inserted between the output shaft 8 of the sub-gearbox 3 and a continuous drive shaft 9 of the electrical machine 6 is the disconnecting clutch 5 (such for example as a conventional dry friction clutch).

The electrical machine 6 is for example a three-phase machine (not shown) which is known for hybrid drives, having a rotor on the continuous drive shaft 9 and a stator fixed to its housing, and, via an electronic controlling arrangement (not shown), it can be connected as a drive motor, to rotate freely or unpowered, or to act as a generator to supply current to the traction battery of the motor vehicle.

The continuous drive shaft 9 is also connected for drive to the input shaft 10 of the second sub-gearbox 4, whose output shaft 11 drives the rear axle differential 7 of the motor vehicle. The axle differential 7 may for example be a bevel gear differential of conventional design.

The second sub-gearbox 4 takes the form of a planetary gearbox (not shown) whose input member (such as the ring gear for example) can be locked to the input shaft 10, whose planet-gear carrier can be locked, as an output member, to the output shaft 11, and whose sun wheel can be locked as a reaction member, all by means of a brake (gear ratio I).

Also, via a built-in multi-plate clutch, the input member or ring gear and the output member or planetary-gear carrier can be connected together to obtain 1:1 transmission (gear ratio II).

The second sub-gearbox 4 may also be a mount gearbox (gearboxmount) or any other kind of manual or automated transmission, shiftable in the two gear ratios I and II.

By the two gear ratios I and II provided by the downstream sub-gearbox 4, the four forward gears of the sub-gearbox 3 can be multiplied or extended to eight forward gears when the motor vehicle is in the internal combustion engine driven mode, the overall transmission by the gearboxes 3 and 4 producing a spread of approximately 6.

The gear ratios I and II of the sub-gearbox 4 are also so designed that, over the whole of the motor vehicle's speed range (of for example 0 to 300 km/h), there are obtained for the electrical machine 6 optimum speed conditions which ensure that there is a sufficiently high starting torque in gear ratio I but which do not cause any overspeeding at the final speed of the motor vehicle in gear ratio II.

The gear ratios of the four forward gears of the sub-gearbox 3 and the two gear ratios of the sub-gearbox 4 are also so designed that both sources of drive reach their speed threshold or maximum speed, as preset by their design, when the motor vehicle is at its final speed in hybrid drive (drive by the internal combustion engine 2 and the electrical machine 6).

From the speed of the motor vehicle and as a function of the demands made by the load, the gear ratios of the two sub-gearboxes 3 and 4 can be changed automatically or the four forward gears of the sub- gearbox 3 can be changed manually (when it is a manual gearbox) and the sub-gearbox 4 (when it is a planetary gearbox, otherwise can be changed manually too) can be changed automatically by electro-hydraulic means following a defined pattern of change.

From the speed of the motor vehicle and as a function of the demands made by the load, the gear ratios of the two sub-gearboxes 3 and 4 can be changed automatically or the four forward gears of the sub-gearbox 3 can be changed manually (when it is a manual gearbox) and the sub-gearbox 4 (when it is a planetary gearbox, otherwise can be changed manuelly too) can be changed automatically by electro-hydraulic means following a defined pattern of change.

In the electric motor driven mode, the disconnecting clutch 5 is disengaged. The internal combustion engine 2 and the sub-gearbox 3 are thus stopped even when the motor vehicle is moving and thus do not create any drag losses or factional losses. Via the sub-gearbox 4, the electrical machine 6 drives the motor vehicle in the two gear ratios I and II; in this case gear ratio I may possibly be enough to cover the speed which the vehicle is able to reach under electric drive.

Figure 2:
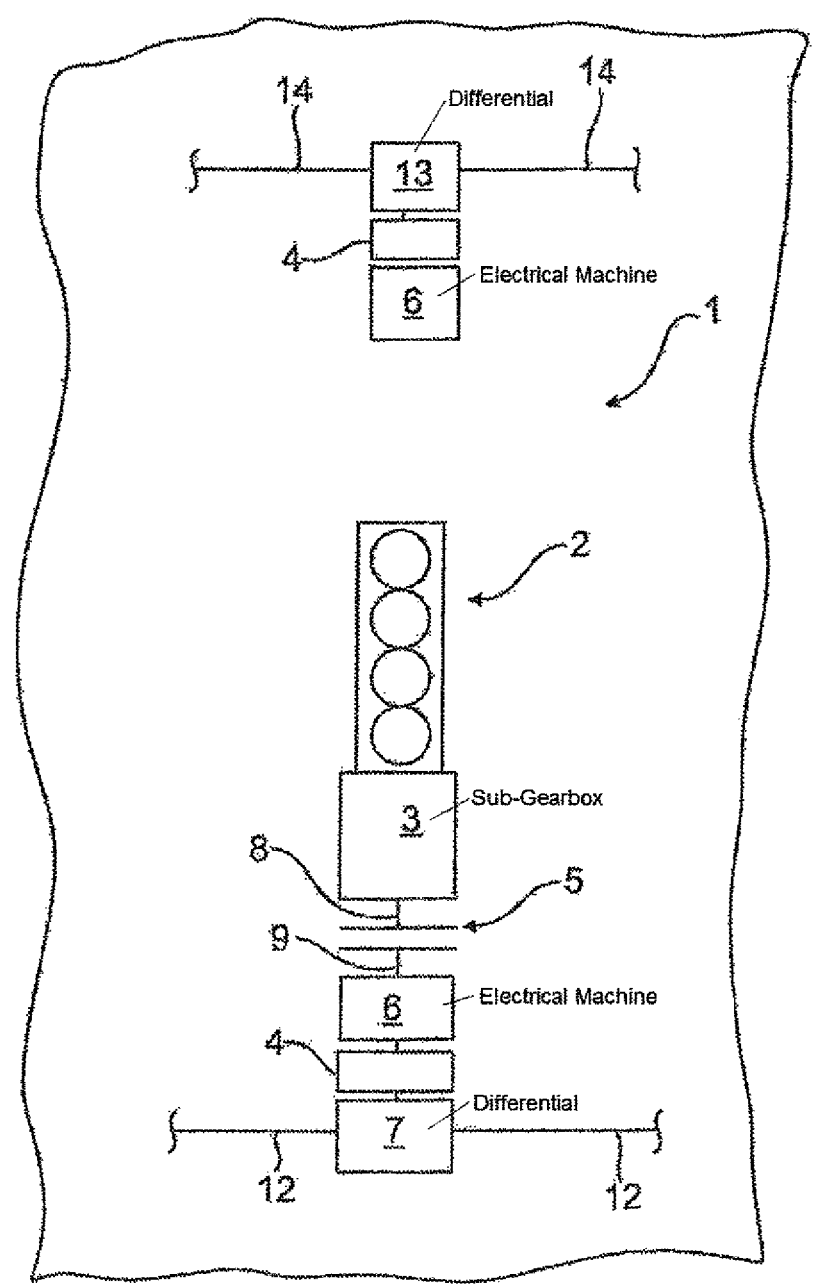
FIG. 2 is a further block circuit diagram, of a drive arrangement as shown in FIG. 1 but one which has a second electrical machine to allow all-wheel drive to be obtained for the motor vehicle.

FIG. 2 shows a further embodiment of the invention for obtaining at least temporary all-wheel drive for a motor vehicle. Parts which perform the same functions have been given the same reference numerals. The description is confined to the major changes in relation to FIG. 1.

In FIG. 2, the hybrid drive arrangement 1' of the motor vehicle also has a front axle differential 13, which is able to drive the front wheels of the motor vehicle via half-shafts 14 of which only parts are shown.

Connected to the axle differential 13 in the direction in which power is transmitted is a second electrical machine 6 and a planetary gearbox or sub-gearbox 4 which may be similar in construction to the sub-gearbox 4 of the rear drive assembly shown in FIG. 1 and which likewise has two gear ratios I and II.

All-wheel drive of the motor vehicle can be controlled by means of this front drive assembly 13, 6, 4, in which case the front wheels of the motor vehicle can be driven electrically and the rear wheels electrically, by the internal combustion engine, or by a combination of the two.

Change between the gear ratios I and II of the second electrical machine 6 can be automatic as a function of the speed of the motor vehicle; in the electric motor driven mode this change may be made in a similar way in synchronization with the first electrical machine 6.

Change between the gear ratios I and II of the second electrical machine 6 can be automatic as a function of the speed of the motor vehicle; in the electric motor driven mode this change may be made in a similar way in synchronisation with the first electrical machine 6.

When there are two electrical machines 6 (FIG. 2) and when the motor vehicle is braking, i.e. is in the recuperation mode, only one (preferably the front electrical machine 6) or both electrical machines 6 are connected as generators, as dictated by the braking power required.

FIG. 3 only roughly outlines an alternative embodiment of the second, electrically driven drive axle which is designed with two electrical machines 6 instead of the differential 13 according to FIG. 2.

In this case, the two electrical machines 6 are aligned coaxially to the drive shafts 14 driving the wheels and separately each drive a wheel of the drive axle (here the front axle) of the motor vehicle. The planetary gear boxes 4 can be omitted if the drive torques of the two electrical machines 6 are sufficient.

By correspondingly actuating the electrical machines 6 they can drive both front wheels with a corresponding differential function (speed compensation) or in order to produce torque vectoring, e.g. when cornering, deliver a higher torque to the wheel on the outside of the bend and a lower torque to the wheel on the inside of the bend.

The invention is not limited to the embodiments which have been described.

In particular, rather than being the rear-wheel drive described which is shown in FIG. 1, the drive arrangement 1, 1' may also take the form of a front-wheel drive in the internal combustion engine driven mode with the sub-units arranged in the reverse order.

The internal combustion engine 2, the two sub-gearboxes 3, 4, the disconnecting clutch 5, the electrical machine 6 and the axle differential 7 shown in FIG. 1 may, if required, be combined into a single drive unit or may be connected together by one or more intermediate shafts.

Particularly when of a built-in type, the disconnecting clutch 5 may also take the form of a wet clutch or multi-plate clutch and may be actuated or controlled electro-hydraulically.

The invention claimed is:

1. A drive arrangement for a hybrid-drive motor vehicle, comprising:
   an internal combustion engine configured to drive the motor vehicle;
   a first electrical machine connectable to the internal combustion engine as a generator;
   a speed-change gearbox via which the internal combustion engine and the first electrical machine provide, alternately or together, an output drive to a first axle differential of the motor vehicle, said speed-change gearbox having a plurality of gear ratios and being divided into two sub-gearboxes, with a first one of the two sub-gearboxes having an output and being connected to the internal combustion engine such that the internal combustion engine cannot be uncoupled therefrom;
   a disconnecting clutch arranged at the output of the first one of the two sub-gearboxes and configured to uncouple the internal combustion engine; and
   a second electrical machine configured to drive a second axle differential of the motor vehicle and connected to the second axle differential via a further sub-gearbox which has a plurality of gear ratios which can be changed over,
   wherein the first electrical machine is arranged in a path along which a force is transmitted downstream of the disconnecting clutch but upstream of a second one of the two sub-gearboxes, said second one of the two sub-gearboxes having an output providing the output drive to the first axle differential.

2. The drive arrangement of claim 1, wherein the two sub-gearboxes each have at least two gear ratios.

3. The drive arrangement of claim 1, wherein the gear ratios of the two sub-gearboxes are so configured that the internal combustion engine and the first electrical machine reach their preset maximum speeds at a defined final speed for the motor vehicle.

4. The drive arrangement of claim 1, wherein the second one of the two sub-gearboxes is changeable over from a 1:1 transmission to a gear ratio which differs therefrom.

5. The drive arrangement of claim 1, wherein the second one of the two sub-gearboxes is a planetary gearbox.

6. The drive arrangement of claim 1, wherein the first one of the two sub-gearboxes has a reverse gear.

7. The drive arrangement of claim 1, wherein the first one of the two sub-gearboxes has at least half of the forward gears provided or exactly half of the forward gears and/or three or more forward gears, and in conjunction with the second one of the sub-gearboxes, a defined spread of gear ratios is obtained or preset.

8. The drive arrangement of claim 7, wherein the defined spread is >4.

9. The drive arrangement of claim 1, wherein during an internal combustion engine drive or during a hybrid drive, comprised of an internal combustion engine driven mode and an electric motor driven mode, the second one of the two sub-gearboxes has its gear ratio changed at least as a function of a gear ratio of the first one of the two sub-gearboxes, and, when the motor vehicle is in the electric motor driven mode, the second one of the two sub-gearboxes has its gear ratio changed at least as a function of a speed of the motor vehicle.

10. The drive arrangement of claim 1, wherein the second electrical machine is configured to drive the second axle differential of the motor vehicle so as to obtain all-wheel drive.

11. The drive arrangement of claim 10, wherein the second electrical machine is configured identical in construction to the first electrical machine.

12. The drive arrangement of claim 10, wherein the further sub-gearbox of the second axle differential to provide an additional electrical drive is changed over as a function of a speed of the motor vehicle and/or in synchronization with the second one of the two sub-gearboxes belonging to the first axle differential.

13. The drive arrangement of claim 1, further comprising a traction battery, wherein the first electrical machine is connected to the internal combustion engine as the generator, when the motor vehicle is in an all-wheel drive mode and the traction battery is in a marginal state of charge.

14. A drive arrangement for a hybrid-drive motor vehicle, comprising:
an internal combustion engine configured to drive the motor vehicle;
a first electrical machine connectable to the internal combustion engine as a generator;
a speed-change gearbox via which the internal combustion engine and the first electrical machine provide, alternately or together, an output drive to a first axle differential of the motor vehicle, said speed-change gearbox having a plurality of gear ratios and being divided into two sub-gearboxes, with a first one of the two sub-gearboxes having an output and being connected to the internal combustion engine such that the internal combustion engine cannot be uncoupled therefrom;
a disconnecting clutch arranged at the output of the first one of the two sub-gearboxes and configured to uncouple the internal combustion engine, said first electrical machine being arranged in a path along which a force is transmitted downstream of the disconnecting clutch but upstream of a second one of the two sub-gearboxes, said second one of the two sub-gearboxes having an output providing the output drive to the first axle differential; and
two second electrical machines arranged on an electrically driven drive axle of the motor vehicle to separately and without an axle differential directly or indirectly provide a drive output to drive shafts connected to wheels of the drive axle.

* * * * *

UNITED STATES PATENT AND TRADEMARK OFFICE
CERTIFICATE OF CORRECTION

| | |
|---|---|
| PATENT NO. | : 9,387,753 B2 |
| APPLICATION NO. | : 14/424359 |
| DATED | : July 12, 2016 |
| INVENTOR(S) | : Parenti et al. |

It is certified that error appears in the above-identified patent and that said Letters Patent is hereby corrected as shown below:

Title page item (72), correct the first inventor's first name "Riccado" to read --Riccardo--

Signed and Sealed this
Twenty-third Day of August, 2016

Michelle K. Lee
*Director of the United States Patent and Trademark Office*